Sept. 16, 1958 D. F. CORDRY 2,852,086
AUTOMATIC SPEED CONTROL FOR AUTOMOTIVE VEHICLES
Filed Dec. 10, 1956 3 Sheets-Sheet 1

Durrel F. Cordry,
INVENTOR.
BY
ATTORNEY

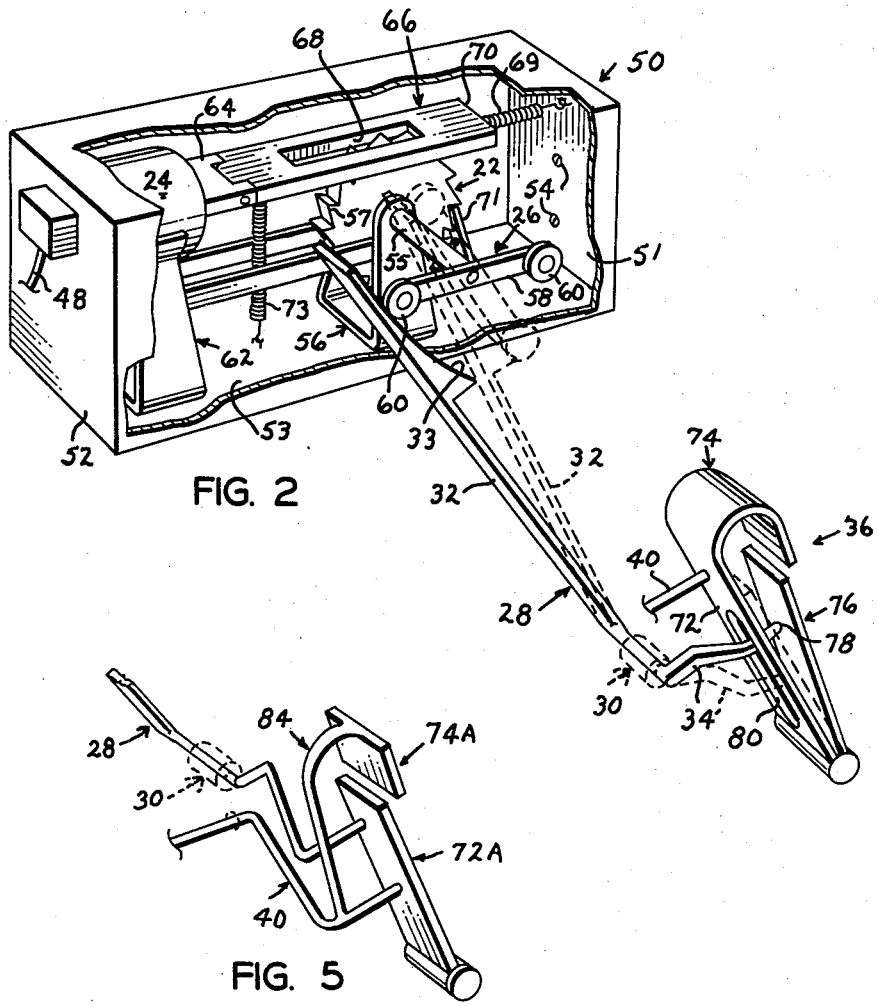

Sept. 16, 1958  D. F. CORDRY  2,852,086
AUTOMATIC SPEED CONTROL FOR AUTOMOTIVE VEHICLES
Filed Dec. 10, 1956  3 Sheets-Sheet 3
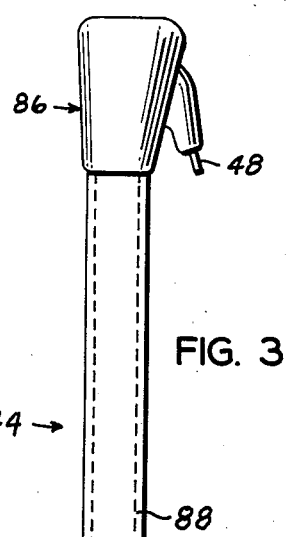
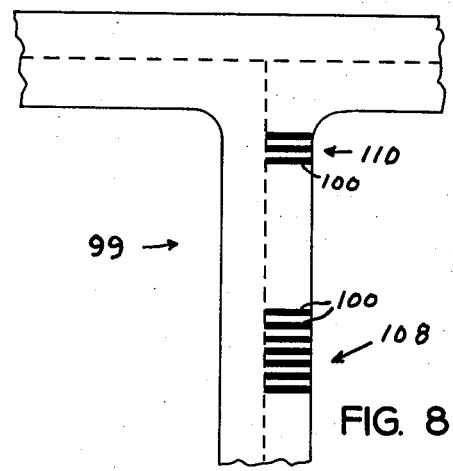
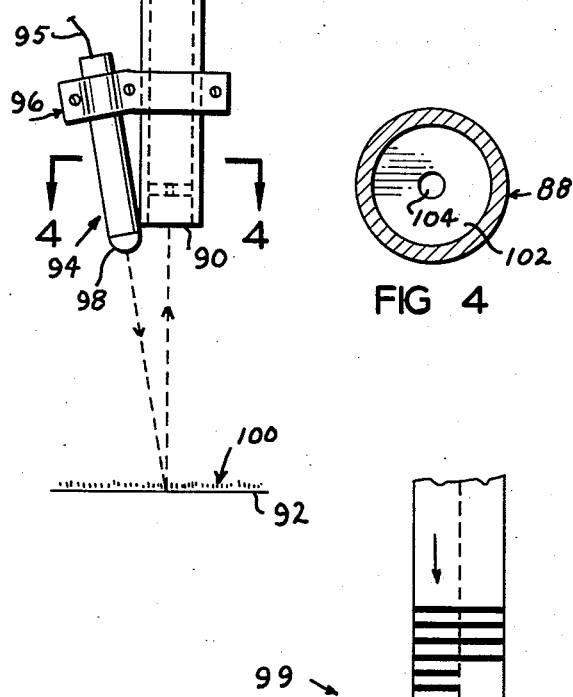
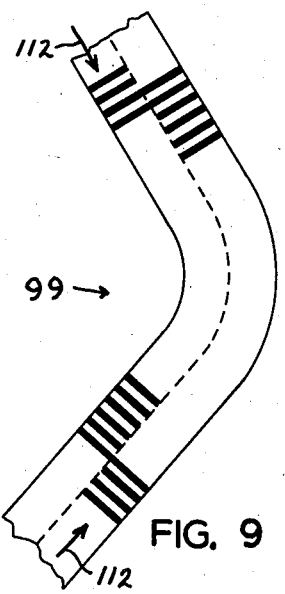
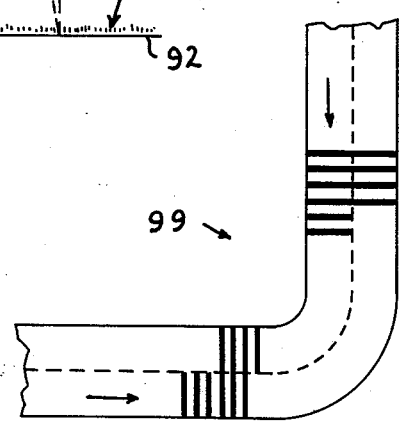
Durrel F. Cordry,
INVENTOR.
BY Loyal J. Miller
ATTORNEY United States Patent Office 2,852,086
Patented Sept. 16, 1958

2,852,086
AUTOMATIC SPEED CONTROL FOR AUTOMOTIVE VEHICLES

Durrel F. Cordry, Hennessey, Okla.

Application December 10, 1956, Serial No. 627,267

3 Claims. (Cl. 180—82.1)

The present invention relates to speed control devices and more particularly to a governor for automatically retarding the acceleration of an automotive vehicle at predetermined locations.

The prior art reveals a number of devices for regulating the fuel control or accelerator of automobile engines which thereby controls the maximum speed of the vehicle. This type of governor works very well for the purposes for which it is intended but fails to provide a means for reducing the acceleration of the vehicle when the same is approaching a dangerous curve or an intersection where the vehicle must come to a complete stop.

It is therefore the principal object of this invention to provide a means for retarding the accelerator of an automotive vehicle at predetermined locations for reducing the speed of the vehicle.

A similarly important object of this invention is to provide a governor for an automotive engine which retards the fuel accelerator sufficiently for reducing the forward speed of the vehicle as desired and which thereafter releases the accelerator so that the original speed may be resumed.

Another object is to provide a governor of this class which by acting to reduce the acceleration of an automobile when approaching a dangerous intersection or the like serves to provide a safety device which will thereby materially reduce the number of accidents involving one or more automobiles.

Another object of this invention is to provide a governor of this class which operates independently of the actions of the driver.

An additional object is to provide a device for governing the speed of a vehicle in which the retardation of the accelerator serves as a warning to the driver, both visibly and physically, that the speed of the vehicle must be reduced.

A further object is to provide a device of this character which will reduce the forward speed of a vehicle to a predetermined rate at selected locations and which also includes a provision permitting the driver to overcome the action of the governor and accelerate the vehicle in case the safety of the vehicle or its occupants might be endangered by the retardation of the speed.

Still another object is to provide a governor of this class which may be actuated by means carried by the road bed over which the vehicle passes.

Yet another object is to provide a device of this class which may be used in connection with any type of automotive vehicle.

An additional object is to provide a device of this class which may be easily attached to a vehicle and which requires little or no attention to maintain the device in operation.

The present invention accomplishes these and other objects by providing an actuator wheel having an axially connected T-shaped shaft bearing against linkage extending through the firewall of an automotive vehicle and contacting the under side of the foot accelerator. The linkage comprises a lever pivotally journaled intermediate its ends by the fire wall of the vehicle. Solenoid means operatively connected with the actuator wheel progressively revolves the same at predetermined intervals. The T-shaped end of the shaft pivots the linkage to retard the accelerator. Electrical responsive means connected to the solenoid by electric wiring energizes the solenoid at predetermined times. The road bed over which the vehicle passes is provided with means for actuating the electrical responsive means.

Other objects will be apparent from the following description when taken in conjunction with the accompanying three sheets of drawings, wherein:

Figure 2 is a perspective view of a part of the device in operating position;

Figure 3 is an elevational view of the electrical responsive means of the device;

Figure 4 is a horizontal cross sectional view taken substantially along line 4—4 of Fig. 3;

Figure 5 is a fragmentary perspective view illustrating an alternate arrangement of the linkage and the accelerator;

Figures 8, 9 and 10 are plan views illustrating the placement of light reflective surfaces on road beds for actuating the device.

Like characters of reference designate like parts in those figures of the drawings in which they occur.

Figure 1:
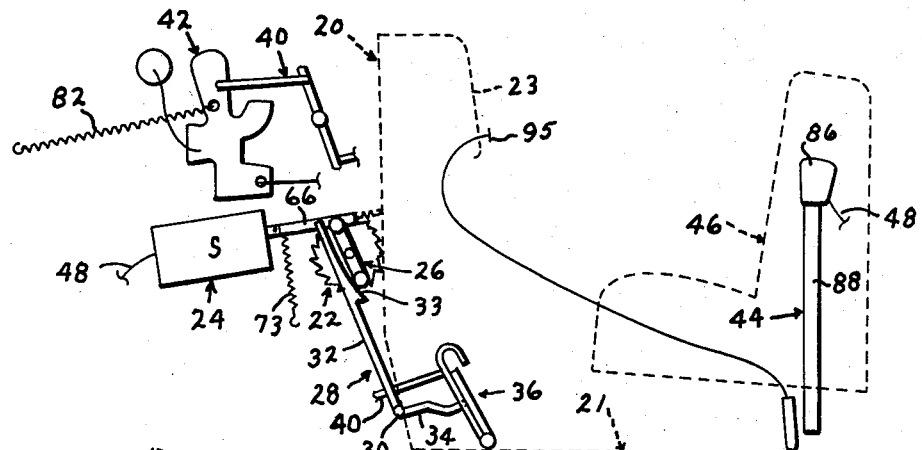
Figure 1 is a diagrammatic view of the device installed on an automobile, a fragment of the automobile being shown in dotted lines.

In the drawings referring more particularly to Fig. 1 the reference numeral 20 indicates as a whole in dotted lines, the fire wall and floor 21 of an automobile. An actuator wheel 22 is mounted on a horizontal axis forwardly of the fire wall 20. Solenoid means 24 is operatively connected to the actuator wheel for rotating the same. A T-shaped shaft 26 is axially connected to the actuator wheel 22. Linkage means comprising a lever or bell crank 28 is pivotally mounted intermediate its ends by the fire wall as at 30. One end of portion 32 of the lever extends forwardly and upwardly from the pivot point 30 and is provided with an arcuately curved concave surface 33 which is disposed adjacent the T-shaped shaft 26. The opposite end portion 34 of the lever extends rearwardly through the fire wall and bears against the forward or under side of the foot accelerator 36. Conventional pivoting accelerator linkage 40 operatively connects the accelerator 36 with the carburetor lever 42. Electrical light responsive means 44 carried by the seat 46 is operatively connected with the solenoid 24 by wiring 48.

Referring now more particularly to Fig. 2 the reference numeral 50 indicates a rectangular box-like support having ends 51 and 52 and a bottom 53. The support end 51 is connected to the forward side of the fire wall 20 by screws 54 and extends forwardly of the firewall. The support 50 is preferably located above the upper limit of the automobile engine adjacent the carburetor, not shown. A supporting stand 56 rigidly connected to the bottom 53 intermediate its ends axially journals the actuator wheel 22 on a horizontal axle 55. The circumferential edge of the actuator wheel 22 is provided with a series of projections or ratchet teeth 57 for the purposes more fully disclosed hereinbelow. The axle 55 projects laterally through one side wall of the support 50 a selected distance. A bar member 58 is rigidly connected perpendicularly medially its ends to the outwardly disposed free end of the axle 55 thus forming the substantially T-shaped shaft 26 rotatively carried by the actuator wheel 22. A small wheel or roller 60 is rotatably mounted adjacent each respective end of the bar member 58 on an axis parallel with relation to the axle 55 for the purposes which will presently be apparent.

The solenoid means 24 is rigidly carried by the support 50 adjacent the forward end 52 by a stand 62 in substantial alignment with the uppermost circumferential edge of the actuator wheel 22. The activated end shaft 64 of the solenoid is hingedly connected to one end of a draw link 66 which extends rearwardly toward the support end 51. The draw link 66 is rectangular in general configuration and is flatly disposed substantially parallel with relation to the support bottom 53. The draw link 66 is provided with a longitudinally extending slot or opening 68 intermediate its ends forming a transverse edge defining the rearward end of the slot for engagement with the uppermost one of the ratchet teeth 57. A spring 69 extends between the rearward end 70 of the draw link 66 and the support end 51 for re-positioning the slot 68 to contact the uppermost one of the ratchet teeth after the solenoid has been energized as will be more fully explained hereinbelow. A second spring 73 extends between the support bottom 53 and the underside of the draw bar 66 for urging the latter downwardly against the wheel 22.

A spring actuated stop 71 pivotally carried by the bottom 53 engages successive ones of the teeth of the wheel 22 as the same is rotated by the solenoid and draw bar 66 to prevent counter-rotation of the wheel.

As illustrated by solid lines in Fig. 1 and by dotted lines in Fig. 2 the bar member 58 is substantially disposed vertically under normal driving conditions. In this position the upper end portion 32 of the lever 28 is disposed adjacent the bar member 58.

The foot feed or accelerator 36 comprises a conventional elongated substantially flat pedal portion 72 hingedly connected in a conventional manner at one end to the floor 21, and a flat false pedal 76 which, under normal driving conditions, lies flatly upon the pedal 72 as shown in dotted lines (Fig. 2). Thus foot pressure applied to the false pedal 76 operates the conventional pedal 72 for actuating the accelerator linkage 40 in a conventional manner. When the solenoid is energized, as more fully explained hereinbelow, the actuator wheel rotates the bar member 58 placing one of the rollers 60 in contact with the lever surface 33 which moves the end portion 32 of the lever 28 forwardly by pivoting the same at the pivot point 30. This action forces the lower rearward end 78 of the lever portion 34 against the under side of the false foot pedal 76 through a slot 80 co-operatingly disposed within the conventional pedal 72 thus raising the pedal 76 and reducing the amount of fuel being fed into the engine. This raising or retarding action of the false pedal 76 serves as a warning to the driver that the speed should be reduced. The purpose of the extended hook-shaped end 74 of the conventional pedal is to permit the driver to contact the same with the toe of his shoe and depress the conventional pedal 72 independently of the retarding action of the false pedal 76 in the event that, in the judgment of the driver an additional acceleration of the vehicle is necessary for safety reasons. Spring means 82 connected to the carburator feed lever 42 acts to pivot the accelerator linkage and maintain the conventional pedal 72 in contact with the underside of the false accelerator pedal 76 as the same is being retarded by the lever 28.

An alternate arrangement of the accelerator is illustrated in Fig. 5 in which the conventional pedal 72A is used without modification. A rod-like member 84 is connected at one end to the accelerator linkage 40 and extends upward and arcuately rearwardly above the free end of the pedal 72A to form an emergency accelerator pedal 74A. The end portion 34 of the lever 28 bears directly against the under side of the pedal 72A for retarding the same as disclosed hereinabove for the pedal 76.

Referring now to Figs. 1, 3 and 4 the electric responsive means 44 comprises a photo electric cell or conventional "electric-eye" 86 connected to one end of an elongated tubular member 88. The lowermost free end 90 of the member 88 is directed downwardly toward the surface of the road bed 92. A lamp 94 is rigidly connected to the member 88 by clamp means 96 so that the beam of the bulb 98 is directed toward the surface of the road bed through an opening, not shown, in the floor 21 of the automobile. A light reflective coating such as luminous paint 100 is applied to the surface of the road bed at selected intervals for reflecting the light rays from the bulb 98 upwardly into the tubular member 88 to actuate the cell 86. The bore of the member 88 is preferably light reflectively coated or lined with aluminum foil for intensifying the beam of light entering the member. A disk 102 having a small axial opening or orifice 104 restricts the amount of light entering the member 88 so that only the light rays from the bulb 98 will actuate the cell 86. This light beam reflection is shown by dotted lines in Fig. 3. Switch and wiring means 95 carried by the dash panel 23 and connected to the lamp 94 permits the driver to turn the lamp on for driving and to turn the same off when the vehicle is parked. The electric responsive means 44 is shown supported by the structure of the seat 48 and directed downwardly through the floor 21 but it is to be understood that the means 44 may be carried in any desired location within or by the framework of the vehicle.

Figs. 8 to 10, inclusive, diagrammatically illustrate fragments of roadways 99 where it is essential that the speed of a vehicle be reduced to certain limits. A series of transverse reflective coatings 100, shown by the heavy lines, are applied to the surface of the road bed in predetermined spaced-apart relation. As the vehicle passes over the road bed each of the reflective surfaces 100 reflects the light beam from the bulb 98 into the cell 86 which energizes the solenoid 24 and revolves the actuator wheel 22 a distance of one tooth 57 thus pivoting the lever 28 by means of the T-shaped shaft 26 contacting the lever surface 33 and thereby retarding the accelerator pedal 76. Since the solenoid 24 and draw link 66 revolves the actuator wheel 22 only one tooth each time the solenoid is actuated, a series of reflective stripes or surfaces 100 are necessary to progressively pivot the lever 28 and retard the accelerator 76 the amount necessary to permit the speed of the vehicle to be reduced the desired amount. Fig. 8 diagrammatically illustrates a plurality of strips 100 spaced a selected distance before the vehicle reaches an intersection of roadways which requires a complete stop. Thus if the actuator wheel is provided with twenty teeth 57 the T-shaped shaft 26 must be moved from its position of repose as shown by dotted lines Fig. 2, a total of seven times by the group of seven reflective surfaces 108 to position the lever 28 in retarded position as illustrated by the position of the shaft 26 shown in solid lines Fig. 2. This retarding action reduces the fuel fed into the engine so that the vehicle is then traveling at approximately ten to fifteen miles per hour from which speed it is easily and safely braked to a stop at the intersection. A group of three additional reflective surfaces 110 are placed on the road surface adjacent the intersection for the purpose of actuating the solenoid these three additional times to continue to revolve the shaft 26 into the position shown by dotted lines (Fig. 2). Thus the actuator wheel 22 and the T-shaped shaft 26 have been revolved substantially 180° which thus permits the accelerator to be depressed a desired amount and the original vehicle speed resumed. The purpose of the concave surface 33 is to maintain co-operative accelerator retarding relation between the T-shaped shaft 26 and the lever 28 as the shaft 26 nears the completion of one-half revolution.

Similarly vehicles approaching a sharp curve in the direction of the arrows 112 as illustrated in Fig. 9 have their speed reduced to a safe maximum by a series of four reflective strips 100. After executing the curve the group of six stripes 100 again actuates the solenoid thus completing a 180° movement of the actuator wheel 22 to release the lever 28 for the resumption of the desired speed. Fig. 10 similarly illustrates the spacing of reflective strips 100 for permitting the vehicle to make a 90° turn or curve and releasing the lever after completion of the turn.

Figure 11:
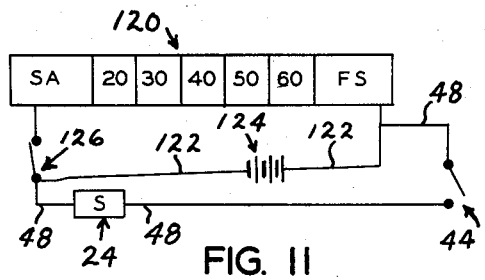
Figure 11 is a schematic of the electrical wiring of the device.

A visible permissible speed indicator 120 (Fig. 11) is installed on the dash board 23 in front of the driver which is connected by wiring 122 to the battery 124 and includes a switch 126. Before the device has been actuated the block marked "FS" indicating permissible full speed lights up. When the photocell means 44 actuates the T-shaft 26 and retards the accelerator the permissible miles per hour indicator blocks are lighted, in progressive sequence, from "60" to "20" as the solenoid 24 is progressively actuated. When the accelerator is completely retarded the indicator block "SA" is lighted indicating a complete stop ahead.

While the drawings illustrate the photocell means 44 being directed toward reflective surfaces on the surface of the road bed it is to be understood that the light reflective surfaces might well be carried by signs or the like placed at the road side and that the photocell means 44 and lamp 98 could be directed toward these sign positions.

Figure 6:
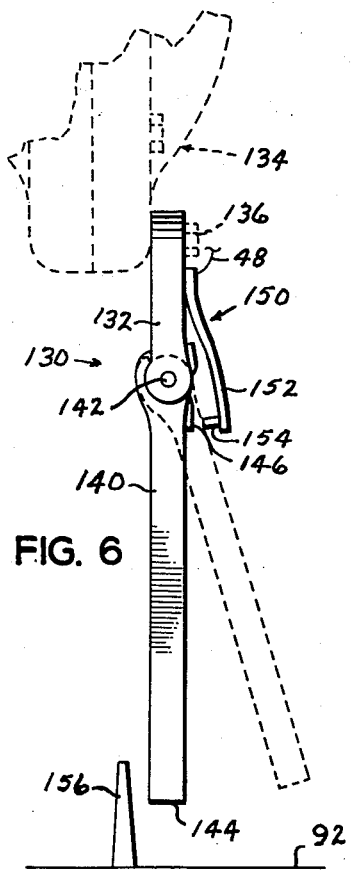
Figure 6 is an elevational view of an alternate electrical responsive means.
Figure 7:
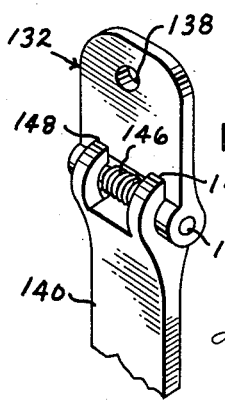
Figure 7 is a fragmentary perspective view illustrating the hinge connection of the means shown in Fig. 6.

Obviously the solenoid 24 might be actuated by means other than a photocell or electric eye and one such means 130 is illustrated in Figs. 6 and 7 which includes an upper plate 132 rigidly connected in depending relation to a portion of the vehicle such as the differential housing 134 by a bolt 136 through a perforation 138 through the plate. A control member or arm 140 is hingedly connected at one end in depending relation to the depending end of the plate 132 permitting rearward pivoting movement relative to the forward movement of the vehicle about the horizontal hinge pin 142. The length of the arm is such that the lowermost end 144 is adjacent but spaced above the surface of the road bed 92. Spring means 146 carried by the hinge pin 142 maintains the arm 140 in vertical depending relation below the plate 132. Lugs 148 integrally carried by the hingedly connected end of the arm 140 bear against the forward side of the plate and act as a stop for limiting the forward movement of the arm by the spring means 146. Switch means 150 is electrically insulated from and carried by the plate 132 and includes a switch arm 152 which extends downwardly beyond the upper end of the arm 140 in spaced relation rearwardly thereof. A contact point 154 is provided on the lowermost end of the switch arm 152 for contacting the upper portion of the arm 140 when the same is pivoted rearwardly as shown by dotted lines, (Fig. 6). The wiring 48 is connected to the switch means 150. Thus when the arm 140 makes contact with the contact point 154 the solenoid is actuated.

One means of pivoting the arm 140 for actuating the device is shown in Fig. 6 which includes an upstanding projection 156 transversely carried by the road bed 92 between the areas normally used by the wheels. The projection extends upwardly a distance sufficient to contact the lowermost end 144 of the arm 140 and cause the same to be pivoted rearwardly, as shown by dotted lines, as the vehicle moves forwardly over the projection. One such projection 156 is located on the road bed 92 in the positions disclosed hereinabove for the light reflective surfaces 100. Thus a series of spaced-apart projections 156 serves to progressively actuate the device and retard the accelerator in a similar manner as does the light reflective surfaces. The projection 156 is preferably formed of resilient material, such as rubber, so that it will regain its perpendicular relation to the road in case vehicle wheels pass over it.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An automatic speed governor for an automotive vehicle having a fire wall and an accelerator pedal mounted near the fire wall, including: an actuator wheel; linkage operatively connecting said actuator wheel to said accelerator pedal, said linkage including a shaft rigidly connected axially at one end to said actuator wheel, said shaft having a T-shaped free end, a lever pivotally mounted intermediate its ends by said fire wall and having one end adapted to contact and be moved by the T-shaped end of said shaft, the other end of said lever bearing against said accelerator pedal; solenoid means for operating said actuator wheel; and means for energizing said solenoid means at predetermined times whereby said solenoid progressively revolves said actuator wheel for pivoting said linkage and retarding the accelerator pedal.

2. In an automatic speed governor for an automotive vehicle having a transverse fire wall and an accelerator, the combination with means carried by the road bed for actuating the governor of: an actuator wheel carried by the vehicle adjacent the forward side of said fire wall; solenoid means for progressively rotating said actuator wheel; a T-shaped shaft axially connected at its shank end to said actuator wheel; linkage operatively connecting the T-shaped end of said shaft to said accelerator, said linkage including a lever pivotally connected intermediate its ends to said fire wall and extending forwardly and rearwardly thereof, the forward end of said lever being disposed against the T-shaped end of said shaft, the rearward end of said lever bearing against the under side of said accelerator; and means for energizing said solenoid means whereby said T-shaped shaft pivots said linkage for retarding said accelerator and controlling the speed of said vehicle.

3. An automatic governor for an automotive vehicle having an accelerator, including: a rotatably mounted ratchet wheel carried by said vehicle; a shaft projecting axially from said ratchet wheel; a bar member rigidly connected perpendicularly medially its ends to said shaft; a roller journaled on an axis parallel with said shaft by each end, respectively, of said bar member; a lever pivotally carried by said vehicle, one end of said lever disposed against said accelerator, the end portion of said lever opposite the said one end being disposed adjacent said bar member in contact with each of said rollers; a solenoid carried by said vehicle adjacent said ratchet wheel; a draw link connected at one end to said solenoid, said draw link having a slot intermediate its ends defining a transverse edge of said link for engaging with the teeth of said ratchet wheel; spring means urging the transverse edge of said draw link into successive engagement with the teeth of said ratchet wheel; and electrical responsive means connected to said solenoid for progressively rotating said ratchet wheel at predetermined times whereby said bar member pivots said lever and retards said accelerator.

References Cited in the file of this patent
UNITED STATES PATENTS

| | | |
|---|---|---|
| 1,577,173 | Capra | Mar. 16, 1926 |
| 2,208,016 | Cowles | July 16, 1940 |
| 2,209,158 | Goldsmith | July 23, 1940 |
| 2,317,400 | Paulus et al. | Apr. 27, 1943 |
| 2,397,475 | Dinga | Apr. 2, 1946 |
| 2,493,755 | Ferrill | Jan. 10, 1950 |
| 2,780,300 | Beyer | Feb. 5, 1957 |